United States Patent
Kim et al.

(10) Patent No.: US 10,390,332 B2
(45) Date of Patent: Aug. 20, 2019

(54) METHOD FOR TRANSCEIVING SIGNALS BETWEEN A BASE STATION AND A RELAY NODE IN A MULTIUSER MULTI-ANTENNA WIRELESS COMMUNICATION SYSTEM, AND APPARATUS FOR SAME

(71) Applicant: LG Electronics Inc., Seoul (KR)

(72) Inventors: Hak Seong Kim, Anyang-si (KR); Han Byul Seo, Anyang-si (KR); Byoung Hoon Kim, Anyang-si (KR); Ki Jun Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/244,825

(22) Filed: Aug. 23, 2016

(65) Prior Publication Data
US 2016/0366678 A1 Dec. 15, 2016

Related U.S. Application Data

(63) Continuation of application No. 14/749,415, filed on Jun. 24, 2015, now Pat. No. 9,445,415, which is a
(Continued)

(51) Int. Cl.
*H04W 72/04* (2009.01)
*H04L 5/00* (2006.01)
(Continued)

(52) U.S. Cl.
CPC ...... *H04W 72/0406* (2013.01); *H04B 7/0452* (2013.01); *H04L 5/0023* (2013.01);
(Continued)

(58) Field of Classification Search
CPC ........... H04W 72/0406; H04W 72/042; H04W 72/14; H04W 88/08; H04B 7/0452;
(Continued)

(56) References Cited

U.S. PATENT DOCUMENTS

| | | | |
|---|---|---|---|
| 8,305,957 B2 * | 11/2012 | Frederiksen | H04W 72/0406 370/328 |
| 8,730,903 B2 | 5/2014 | Seo et al. | |

(Continued)

FOREIGN PATENT DOCUMENTS

| | | |
|---|---|---|
| EP | 2493092 | 8/2012 |
| JP | 2003-198442 | 7/2003 |

(Continued)

OTHER PUBLICATIONS

ZTE, "R-PDCCH Multiplexing and Relevant Problems," TSG-RAN WG1 #60, R1-100975, Feb. 2010, 8 pages.
(Continued)

*Primary Examiner* — Jenee Holland
*Assistant Examiner* — Latresa A McCallum
(74) *Attorney, Agent, or Firm* — Lee Hong Degerman Kang Waimey

(57) ABSTRACT

The present disclosure relates to a method in which a base station transmits signals to a relay node in a multiuser multi-antenna (MIMO) wireless communication system. More particularly, the method includes: allocating one or more antenna ports to one or more relay nodes, respectively; mapping each of a plurality of downlink grant signals for the one or more relay nodes to a preset resource domain from among resource domains corresponding to one of the allocated antenna ports; mapping uplink grant signals or data signals for the one or more relay nodes to the resource domains corresponding to the allocated antenna ports; and transmitting the mapped signals to the one or more relay nodes.

4 Claims, 21 Drawing Sheets

Related U.S. Application Data continuation of application No. 13/642,954, filed as application No. PCT/KR2011/002882 on Apr. 21, 2011, now Pat. No. 9,100,144.

(60) Provisional application No. 61/327,110, filed on Apr. 23, 2010.

(51) Int. Cl.
| | | |
|---|---|---|
| *H04B 7/0452* | (2017.01) | |
| *H04W 72/14* | (2009.01) | |
| *H04B 7/0413* | (2017.01) | |
| *H04W 88/08* | (2009.01) | |

(52) U.S. Cl.
CPC .......... *H04L 5/0032* (2013.01); *H04L 5/0044* (2013.01); *H04L 5/0078* (2013.01); *H04L 5/0094* (2013.01); *H04W 72/042* (2013.01); *H04W 72/14* (2013.01); *H04B 7/0413* (2013.01); *H04L 5/0053* (2013.01); *H04L 5/0069* (2013.01); *H04L 5/0073* (2013.01); *H04L 5/0092* (2013.01); *H04W 88/08* (2013.01)

(58) Field of Classification Search
CPC ... H04B 7/0413; H04L 5/0023; H04L 5/0032; H04L 5/0044; H04L 5/0078; H04L 5/0094; H04L 5/0053; H04L 5/0069; H04L 5/0073; H04L 5/0092
See application file for complete search history.

(56) References Cited

U.S. PATENT DOCUMENTS

| | | | |
|---|---|---|---|
| 2004/0190482 A1* | 9/2004 | Baum .................. | H04W 72/082 370/347 |
| 2008/0008134 A1* | 1/2008 | Satou ..................... | H04B 7/063 370/334 |
| 2008/0298224 A1 | 12/2008 | Pi et al. | |
| 2009/0207784 A1 | 8/2009 | Lee et al. | |
| 2009/0232075 A1* | 9/2009 | Konta ................... | H04L 5/0096 370/329 |
| 2009/0303918 A1 | 12/2009 | Ma et al. | |
| 2010/0061345 A1* | 3/2010 | Wengerter ............ | H04L 1/0004 370/335 |
| 2010/0265901 A1 | 10/2010 | Koo et al. | |
| 2011/0038327 A1* | 2/2011 | Moon ..................... | H04L 1/004 370/329 |
| 2011/0141987 A1 | 6/2011 | Nam et al. | |
| 2011/0274031 A1* | 11/2011 | Gaal .................... | H04L 5/0051 370/315 |
| 2011/0292903 A1 | 12/2011 | Jongren et al. | |
| 2012/0002593 A1 | 1/2012 | Kim et al. | |
| 2012/0033643 A1 | 2/2012 | Noh et al. | |
| 2012/0093061 A1 | 4/2012 | Charbit et al. | |
| 2012/0236798 A1* | 9/2012 | Raaf .................... | H04B 7/0452 370/328 |
| 2013/0051310 A1 | 2/2013 | Kim et al. | |
| 2015/0296494 A1 | 10/2015 | Kim et al. | |

FOREIGN PATENT DOCUMENTS

| | | |
|---|---|---|
| JP | 2008-118337 | 5/2008 |
| JP | 2011-530964 | 12/2011 |
| JP | 2012-504913 | 2/2012 |
| WO | 2007055544 | 5/2007 |
| WO | 08/018468 | 2/2008 |
| WO | 2009139558 | 11/2009 |
| WO | 2010/026287 | 3/2010 |
| WO | 2011021852 | 2/2011 |

OTHER PUBLICATIONS

IP Australia Application Serial No. 2011243372, Office Action dated Jan. 10, 2014, 4 pages.
CATT, "Design of Relay Reference Signal on Backhaul in LTE-A," 3GPP TSG RAN WG1 meeting #60bis, R1-101779, Apr. 2010, 9 pages.
Qualcomm Inc., "DM-RS for R-PDCCH," 3GPP TSG-RAN WG1 #60bis, R1-102345, Apr. 2010, 5 pages.
Panasonic, "R-PDCCH placement," 3GPP TSG RAN WG1 Meeting #60bis, R1-102042, Apr. 2010, 3 pages.
European Patent Office Application Serial No. 11772252.0, Search Report dated Oct. 2, 2014, 8 pages.
PCT International Application No. PCT/KR2011/002882, Written Opinion of the International Searching Authority dated Jan. 2, 2012, 15 pages.
CATT, "Design of Relay Backhaul Control Channels in LTE-A, " 3GPP TSG RAN WG1 meeting #59, R1-094562, Nov. 2009, 5 pages.
Samsung, "R-PDCCH design," 3GPP TSG RAN WG1 Meeting #60bis, R1-102218, Apr. 2010, 4 pages.
Qualcomm Inc., "R-PDCCH design," 3GPP TSG-RAN WG1 #60bis, R1-102344, Apr. 2010, 7 pages.
ZTE, et al., "WF on R-PDCCH Multiplexing," TSG-RAN WG1 Meeting #60bis, R1-102551, Apr. 2010, 2 pages.
United States Patent and Trademark Office U.S. Appl. No. 14/749,415, Final Office Action dated Feb. 11, 2016, 18 pages.
Samsung, "Some considerations on Downlink Backhaul Control Design in type I relay", R1-092660, 3GPP TSG RAN WG1 Meeting #57bis, Jul. 2009, 5 pages.
European Patent Office Application Serial No. 11772252.0, Office Action dated Apr. 13, 2018, 9 pages.
Panasonic, "[60-10-LTE-A]: Email discussion on backhaul design for Type 1 relays", 3GPP TSG RAN WG1 Meeting #60bis, R1-102538, XP050419797, Apr. 2010, 12 pages.

* cited by examiner (a) control-plane protocol stack (b) user-plane protocol stack (a) 1TX or 2TX (b) 4 TX

FIG. 12

| | | |
|---|---|---|
| antenna port 3 | R-PDSCH (RN2) | R-PDSCH (RN2) |
| | (1200) | R-PDSCH (RN2) |
| | (1200) | R-PDSCH (RN2) |

| | | |
|---|---|---|
| antenna port 2 | R-PDSCH (RN2) | R-PDSCH (RN2) |
| | DL grant (RN2) (1202) | R-PDSCH (RN2) |
| | (1200) | R-PDSCH (RN2) |

| | | |
|---|---|---|
| antenna port 1 | R-PDSCH (RN1) | R-PDSCH (RN1) |
| | (1200) | R-PDSCH (RN1) |
| | (1200) | R-PDSCH (RN1) |

| | | |
|---|---|---|
| antenna port 0 | R-PDSCH (RN1) | R-PDSCH (RN1) |
| | (1200) | R-PDSCH (RN1) |
| | DL grant (RN1) (1201) | R-PDSCH (RN1) |

RB

2nd slot mapping and multiplexing information (MAMI)

FIG. 15

| PO-41 | PO-42 |
|---|---|
| PO-31 | PO-32 |
| PO-21 | PO-22 |
| DL grant | UL grant or R-PDSCH |

FIG. 16

METHOD FOR TRANSCEIVING SIGNALS BETWEEN A BASE STATION AND A RELAY NODE IN A MULTIUSER MULTI-ANTENNA WIRELESS COMMUNICATION SYSTEM, AND APPARATUS FOR SAME

CROSS-REFERENCE TO RELATED APPLICATIONS

This application is a continuation of U.S. patent application Ser. No. 14/749,415, filed on Jun. 24, 2015, now U.S. Pat. No. 9,445,415, which is a continuation of U.S. patent application Ser. No. 13/642,954, filed on Oct. 23, 2012, now U.S. Pat. No. 9,100,144, which is the National Stage filing under 35 U.S.C. 371 of International Application No. PCT/KR2011/002882, filed on Apr. 21, 2011, which claims the benefit of U.S. Provisional Application No. 61/327,110, filed on Apr. 23, 2010, the contents of which are all hereby incorporated by reference herein in their entirety

TECHNICAL FIELD

The present invention relates to a wireless communication system, and more particularly, to a method for transceiving signals between a base station and a relay node in a multiuser multi-antenna wireless communication system and an apparatus for the same.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS (100) includes a User Equipment (UE; 101), base stations (eNode B and eNB; 102), and an Access Gateway (AG; 103) which is located at an end of a network (E-UTRAN) and connected to an external network. Generally, the base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that may be used by the corresponding user equipment, and information related to encoding, data size, and HARQ. An interface for transmitting user traffic or control traffic may be used between the base stations. An interface for transmitting user traffic or control traffic may be used between the base stations. A Core Network (CN; 104) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

On the basis of the aforementioned discussion, an object of the present invention is to provide a method for transceiving signals between a base station and a relay node in a multiuser multi-antenna wireless communication system and an apparatus for the same.

Technical Solution

According to one aspect of the present invention, a method for transmitting signals from a base station to a relay node in a multiuser multi-antenna (MIMO) wireless communication system comprises the steps of allocating one or more antenna ports to one or more relay nodes, respectively; mapping each of a plurality of downlink grant signals for the one or more relay nodes to a preset resource region among resource regions corresponding to one of the allocated antenna ports; mapping uplink grant signals or data signals for the one or more relay nodes to the resource regions corresponding to the allocated antenna ports; and transmitting the mapped signals to the one or more relay nodes.

In another aspect of the present invention, a base station in a multiuser multi-antenna (MIMO) wireless communication system comprises a processor allocating one or more antenna ports to one or more relay nodes, respectively, mapping each of a plurality of downlink grant signals for the one or more relay nodes to a preset resource region among resource regions corresponding to one of the allocated antenna ports, and mapping uplink grant signals or data signals for the one or more relay nodes to the resource regions corresponding to the allocated antenna ports; and a transmission module transmitting the mapped signals to the one or more relay nodes.

In this case, the preset resource region into which the downlink grant signals are mapped is the first slot of a specific subframe, and the second slot of the preset resource region into which the downlink grant signals are mapped may be mapped with data signals of a relay node, which correspond to the downlink grant signals.

Also, the preset resource region into which the downlink grant signals are mapped may be included in resource regions corresponding to one antenna port.

Meanwhile, each of the downlink grant signals for the one or more relay nodes may include information on the resource region into which uplink grant signals or data signals for a corresponding relay node are mapped.

The preset resource region into which the downlink grant signals are mapped may be varied depending on the one or more relay nodes. In this case, the preset resource region into which the downlink grant signals are mapped is not used for signal mapping in resource regions corresponding to different antenna ports.

Also, the antenna ports are defined by combination of a physical antenna port and a scrambling code.

Advantageous Effects

According to the embodiments of the present invention, a base station and a relay node may efficiently transmit and receive signals to and from each other in a multiuser multi-antenna wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 12 is a diagram illustrating R-PDCCH and R-PDSCH multiplexing in a multiuser MIMO system according to the second embodiment of the present invention;

FIG. 15 is a diagram illustrating another mapping and multiplexing information inserted into R-PDCCH suggested in the present invention;

FIG. 16 is a diagram illustrating combination of R-PDSCH or uplink grant that may be scheduled in RBG configured by three RBs;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 1:
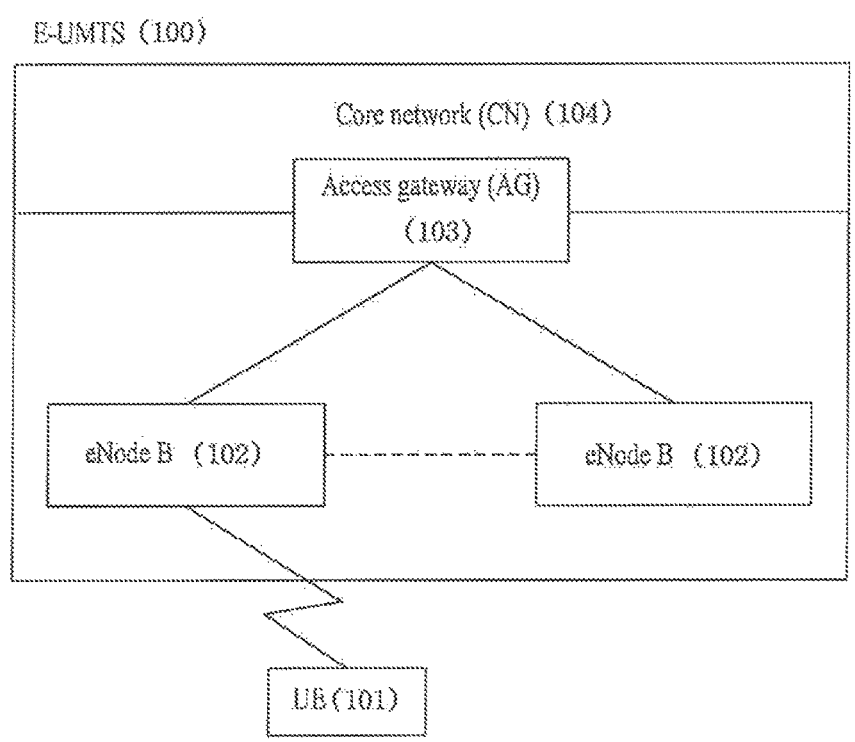
FIG. 1 is a diagram conceptionally illustrating a network structure of an Evolved Universal Mobile Telecommunications System (E-UMTS)
Figure 2:
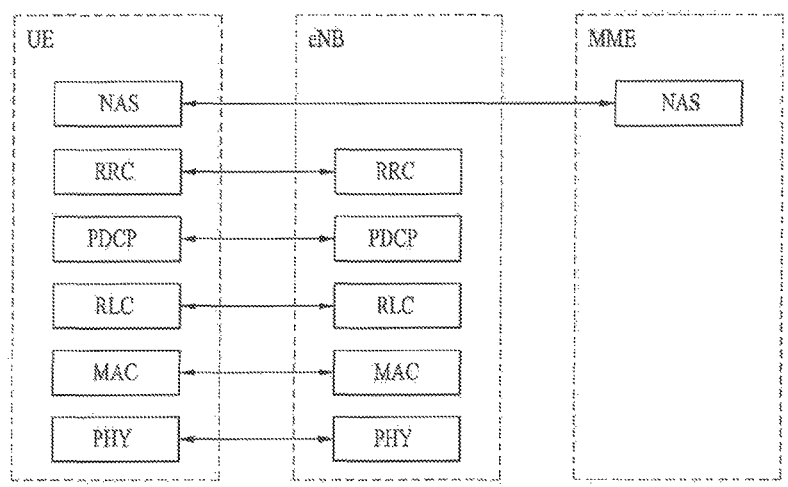
FIG. 2 is a diagram illustrating structures of a control plane and a user plane of a radio interface protocol between a user equipment and E-UTRAN based on the 3GPP radio access network standard.
Figure 2:
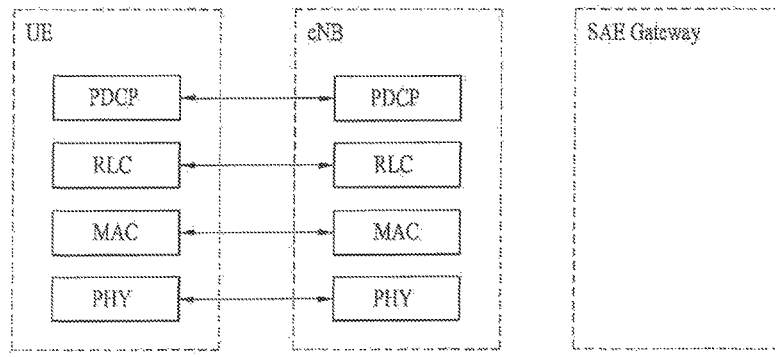

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitter and the other physical layer of a receiver via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths. As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
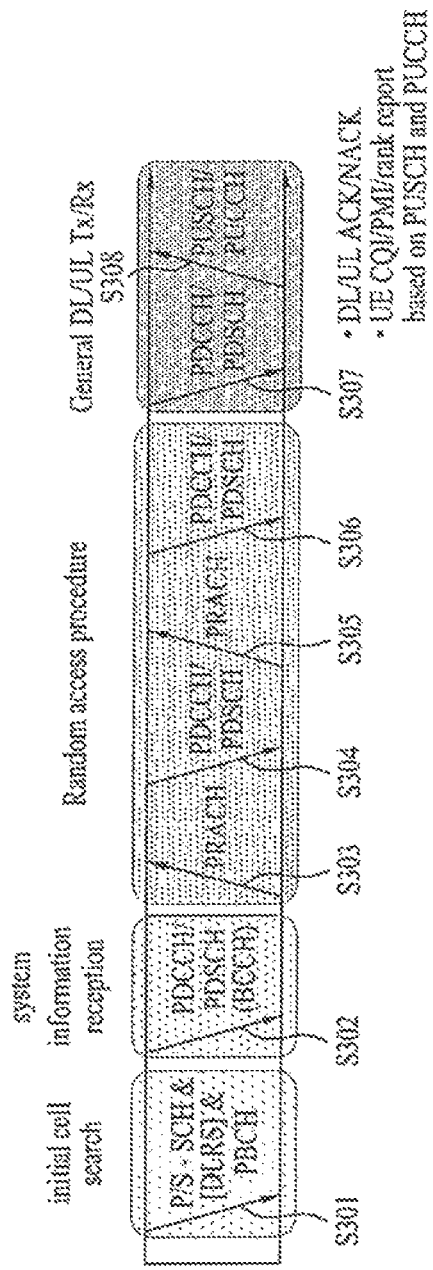
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. The DCI includes control information such as resource allocation information on the user equipment and has different formats depending on its purpose of use.

Meanwhile, the control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment may transmit the aforementioned control information such as CQI/PMI/RI through the PUSCH and/or the PUCCH.

Hereinafter, a MIMO system will be described. Multiple-Input Multiple-Output (MIMO) means a scheme that a plurality of transmitting antennas and a plurality of receiving antennas are used. Data transmission and reception efficiency may be improved by the MIMO scheme. Namely, a transmitter or receiver of a wireless communication system may enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate may be improved within a specific sized cell region, or system coverage may be enhanced with a specific data transmission rate. Also, the MIMO antenna technology may widely be used for a user equipment for mobile communication and a relay station. According to the MIMO antenna technology, it is possible to overcome limitation of a transmission rate in mobile communication according to the related art where a single antenna is used.

Figure 4:
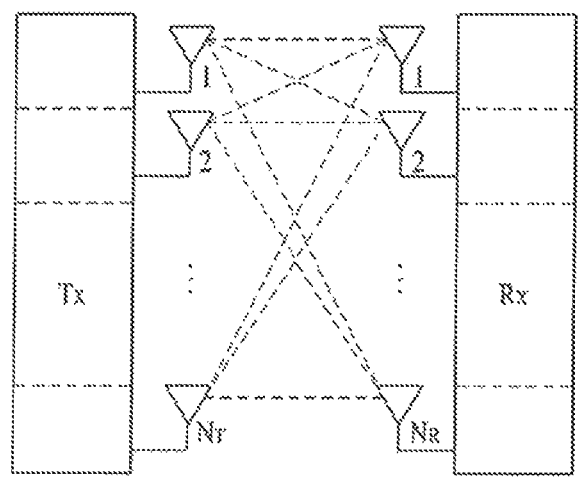
FIG. 4 is a schematic diagram illustrating a multi-antenna communication system.

A schematic diagram of a MIMO communication system described in the present invention is illustrated in FIG. 4. Referring to FIG. 4, $N_T$ number of transmitting antennas are provided at a transmitter while $N_R$ number of receiving antennas are provided at a receiver. If a plurality of antennas are used at both the transmitter and the receiver, theoretical channel transmission capacity is more increased than that a plurality of antennas are used at any one of the transmitter and the receiver. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used may be increased theoretically as expressed by the following Equation 1 as much as a value obtained by multiplying a maximum transmission rate $R_O$ by a rate increase $R_i$. In this case, $R_i$ corresponds to a smaller value of $N_T$ and $N_R$.

$$R_i = \min(N_T, N_R) \quad \text{[Equation 1]}$$

For example, in a MIMO communication system that uses four transmitting antennas and four receiving antennas, a transmission rate four times greater than that of a single antenna system may be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method may be expressed as follows. As illustrated in FIG. 4, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information may be expressed by a vector shown in Equation 2 as follows.

$$s = [s_1, s_2, \cdots, s_{N_T}]^T \quad \text{[Equation 2]}$$

Meanwhile, different kinds of transmission power may be applied to each of the transmission information $S_1, S_2, \ldots, S_{N_T}$. At this time, supposing that each transmission power is $P_1, P_2, \ldots, P_{N_T}$, transmission information of which transmission power is controlled may be expressed by a vector shown in Equation 3 as follows.

$$\hat{s} = [\hat{s}_1, \hat{s}_2, \cdots, \hat{s}_{N_T}]^T = [P_1 s_1, P_2 s_2, \cdots, P_{N_T} s_{N_T}]^T \quad \text{[Equation 3]}$$

Also, $\hat{S}$ may be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel status. Such transmitting signals $x_1, x_2, \ldots, x_{N_T}$ may be expressed by Equation 5 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, a rank in the channel matrix may physically mean the maximum number of rows or columns that may transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 6 below.

$$\text{rank}(H) \leq \min(N_T, N_R) \quad \text{[Equation 6]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that may transmit different kinds of information. Accordingly, the channel matrix H may be expressed by the following Equation 7.

$$\text{\# of streams} \leq \text{rank}(H) \leq \min(N_T, N_R) \quad \text{[Equation 7]}$$

In this case, "# of streams" represents the number of streams. Meanwhile, it is to be understood that one stream may be transmitted through one or more antennas.

Various methods for corresponding one or more streams to several antennas may exist. These methods may be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme may exist.

Figure 5:
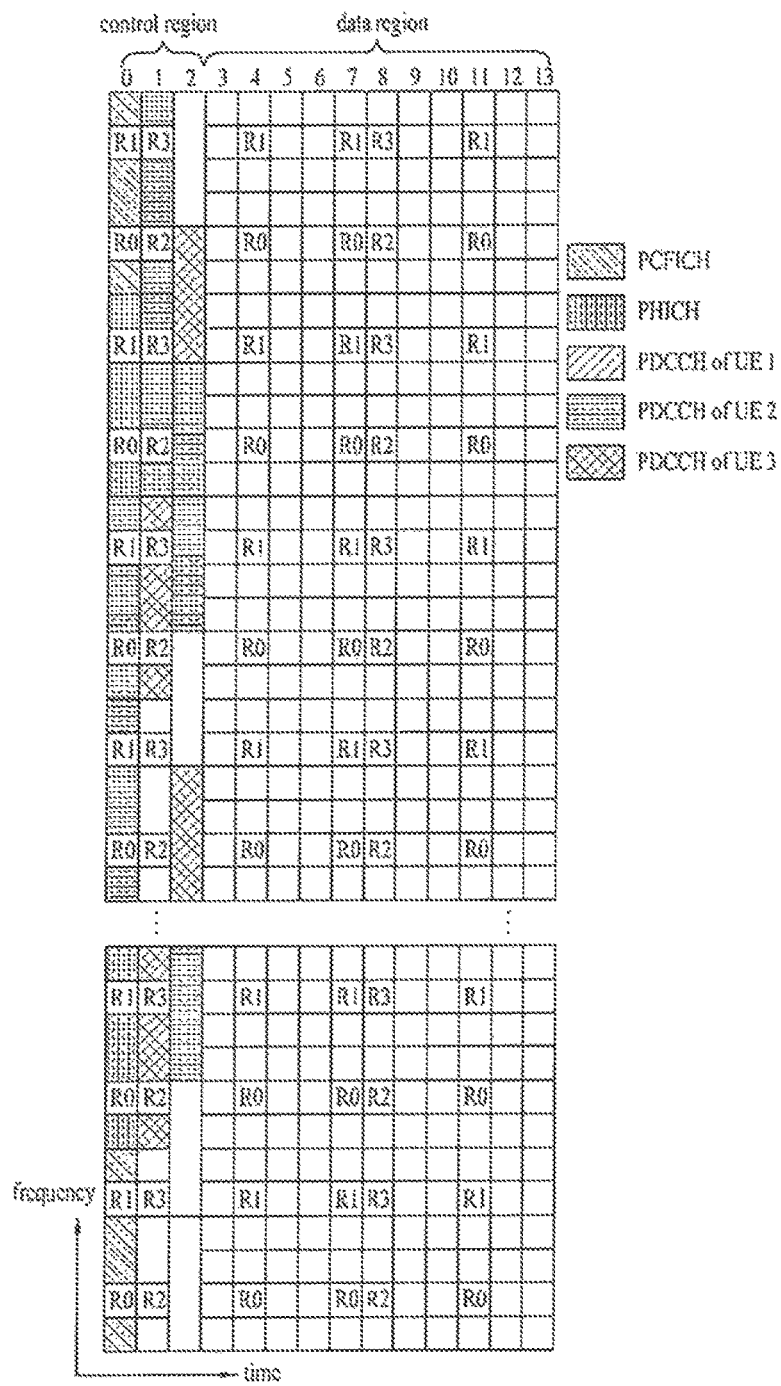
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIGS. 5, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH using their RNTI information, and if there are one or more user equipments having RNTI called "A", the user equipments receive the PDCCH, and receive the PDSCH indicated by "B" and "C" through information of the received PDCCH.

Figure 6:
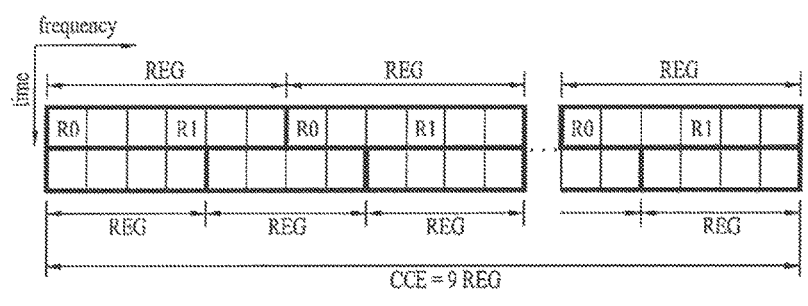
FIG. 6 is a diagram illustrating a resource unit used to constitute a downlink control channel in an LTE system.
Figure 6:
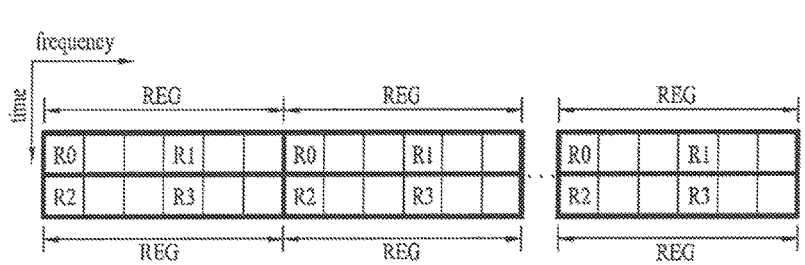
Figure 8:
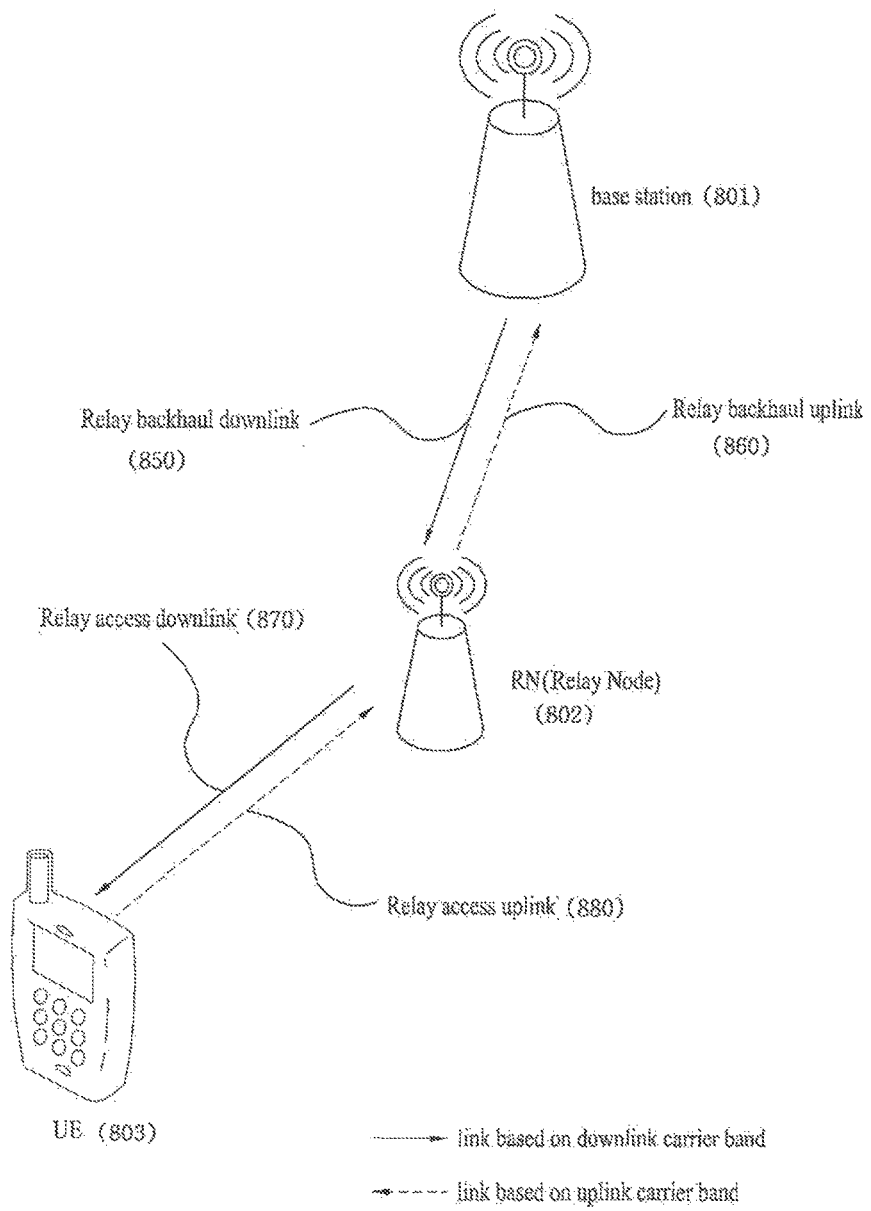
FIG. 8 is a schematic diagram illustrating a relay backhaul link and a relay access link in a wireless communication system.

FIG. 6 is a diagram illustrating a resource unit used to constitute a downlink control channel in an LTE system. In particular, (a) of FIG. 6 illustrates that the number of transmitting antennas belonging to the base station is 1 or 2, and (b) of FIG. 8 illustrates that the number of transmitting antennas belonging to the base station is 4. In (a) and (b) of FIG. 6, different reference signal patterns are illustrated depending on the number of transmitting antennas but a method of establishing a resource unit related to a control channel is illustrated equally.

Referring to FIG. 6, a basic resource unit of the control channel is REG. The REG includes four neighboring resource elements excluding the reference signals. The REG is illustrated with a solid line. The PCFIC and the PHICH include four REGs and three REGs, respectively. The PDCCH is configured in a unit of CCE (control channel element), one CCE including nine REGs.

The user equipment is established to identify $M^{(L)}(\geq L)$ number of CCEs arranged continuously or arranged by a specific rule, whereby the user equipment may identify whether the PDCCH of L number of CCEs is transmitted thereto. A plurality of L values may be considered by the user equipment to receive the PDCCH. CCE sets to be identified by the user equipment to receive the PDCCH will be referred to as a search space. For example, the LTE system defines the search space as expressed in Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L represents the number of CCEs constituting the PDCCH, $S_k^{(L)}$ represents a search space of the CCE aggregation level L, and $M^{(L)}$ represents the number of PDCCH candidates to be monitored in the search space.

The search space may be divided into a UE-specific search space that allows access to only a specific user equipment and a common search space that allows access to all user equipments within a cell. The user equipment monitors a common search space of the CCE aggregation levels of L=4 and L=8, and monitors a UE-specific search space of the CCE aggregation levels of L=1, L=2, L=4 and L=8. The common search space and the UE-specific search space may be overlapped with each other.

Furthermore, in the PDCCH search space given to a random user equipment for each CCE aggregation level value, the location of the first CCE (i.e., CCE having the smallest index) is varied per subframe depending on the user equipment. This will be referred to as a PDCCH search space hashing.

Figure 7:
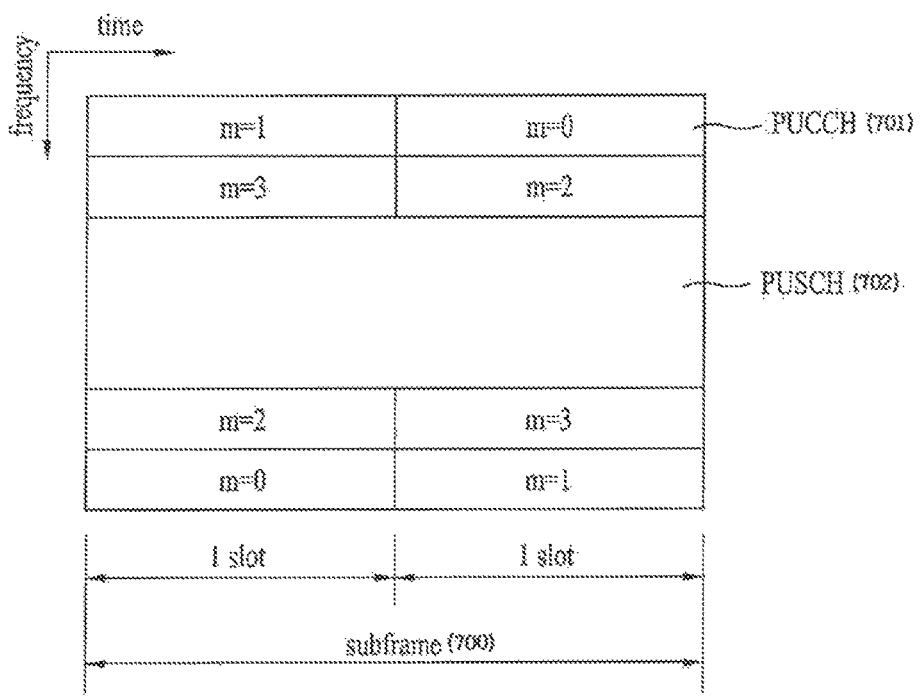
FIG. 7 is a diagram illustrating a structure of an uplink subframe used in an LTE system.

FIG. 7 is a diagram illustrating a structure of an uplink subframe used in an LTE system.

Referring to FIG. 7, the uplink subframe (700) may be divided into a region to which a physical uplink control channel (PUCCH; 701) carrying control information is allocated, and a region to which a physical uplink shared channel (PUSCH; 702) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH undergo frequency hopping in the boundary of the slots. Particularly, FIG. 6 exemplarily illustrates that PUCCH of m=0, PUCCH of m=1, PUCCH of m=2, and PUCCH of m=3 are allocated to the subframe.

Meanwhile, when the channel status between the base station and the user equipment is not good, a relay node (RN) is provided between the base station and the user equipment, whereby a radio channel having the more excellent channel status may be provided to the user equipment. Also, a relay node is provided in a cell edge zone having a poor channel status from the base station, whereby a data channel may be provided at higher speed, and a cell service zone may be extended. In this way, the technology of the relay node has been introduced to remove a radio wave shadow zone in a wireless communication system, and is widely used at present.

The technology of the relay node is being recently developed to more intelligent type than a function of a repeater that simply amplifies a signal and transmits the amplified signal. Moreover, the technology of the relay node reduces the extension cost for installation of base stations and the maintenance cost of a backhaul network in a next generation mobile communication system and at the same time is necessarily required to extend service coverage and improve a data processing rate. As the technology of the relay node is gradually developed, it is required that a new wireless communication system should support a relay node used in the related art wireless communication system.

In a 3rd generation partnership project long term evolution-advanced (3GPP LTE-A) system, as forwarding for link connection between the base station and the user equipment is introduced to the relay node, two types of links having different attributes are applied to each of uplink and downlink carrier frequency bands. A connection link portion established between links of the base station and the relay node will be defined as a backhaul link. Transmission of frequency division duplex (FDD) mode or time division duplex (TDD) mode based on downlink resources will be defined as a backhaul downlink, and transmission of frequency division duplex (FDD) mode or time division duplex (TDD) mode based on uplink resources will be defined as a backhaul uplink.

FIG. 8 is a diagram illustrating a configuration of a relay backhaul link and a relay access link in a wireless communication system.

Referring to FIG. 8, as the relay node (802) is introduced for forwarding for link connection between the base station (801) and the user equipment (803), two types of links having different attributes are applied to each of uplink and downlink carrier frequency bands. A connection link portion established between the base station and the relay node will be defined as a backhaul link. If transmission of the backhaul link is performed using resources of downlink frequency band (in case of FDD) or resources of downlink subframe (in case of TDD), the backhaul link may be expressed as a backhaul downlink (850). If transmission of the backhaul link is performed using resources of uplink frequency band (in case of FDD) or resources of uplink subframe (in case of TDD), the backhaul link may be expressed as a backhaul uplink (860).

On the other hand, a connection link portion between the relay node and a series of user equipments will be defined as a relay access link. If transmission of the relay access link is performed using resources of downlink frequency band (in case of FDD) or resources of downlink subframe (in case of TDD), the relay access link may be expressed as a relay access downlink (870). If transmission of the relay access link is performed using resources of uplink frequency band (in case of FDD) or resources of uplink subframe (in case of TDD), the relay access link may be expressed as a relay access uplink (880).

The relay node (RN) may receive information from the base station through the relay backhaul downlink, and may transmit information to the base station through the relay backhaul uplink. Also, the relay node may transmit information to the user equipment through the relay access downlink, and may receive information from the user equipment through the relay access uplink.

Meanwhile, in respect of band (or spectrum) of the relay node, if the backhaul link is operated in the same frequency band as that of the access link, the operation will be referred to as 'in-band' operation. If the backhaul link is operated in the frequency band different from that of the access link, the operation will be referred to as 'out-band' operation. In both in-band and out-band, a user equipment (hereinafter, referred to as 'legacy user equipment') operated in accordance with the existing LTE system (for example, release-8) should access a donor cell.

The relay node may be classified into a transparent relay node and a non-transparent relay node depending on whether the user equipment recognizes the relay node. The transparent relay node means that it fails to recognize whether the user equipment performs communication with the network through the relay node. The non-transparent relay node means that it recognizes whether the user equipment performs communication with the network through the relay node.

In respect of control of the relay node, the relay node may be classified into a relay node configured as a part of a donor cell and a relay node that controls a cell by itself.

Although the relay node configured as a part of a donor cell has relay node ID, it does not have its own cell identity. If at least a part of radio resource management (RRM) is controlled by a base station to which a donor cell belongs (even though the other parts of the RRM are located in the relay node), it will be referred to as a relay node configured as a part of the donor cell. Preferably, this relay node may support the legacy user equipment. For example, examples of this type relay node include smart repeaters, decode-and-forward relays, L2 (second layer) relay nodes, and type-2 relay node.

The relay node that controls a cell by itself controls one cell or several cells, and a unique physical layer cell identity is provided to each of cells controlled by the relay node. Also, the same RRM mechanism may be used for each of the cells. In view of the user equipment, there is no difference between access to a cell controlled by the relay node and access to a cell controlled by the base station. Preferably, the cell controlled by the relay node may support the legacy user equipment. For example, examples of this type relay node include a self-backhauling relay node, L3 (third layer) relay node, a type-1 relay node and a type-1a relay node.

The type-1 relay node is an in-band relay node and controls a plurality of cells, each of which is regarded as a separate cell differentiated from the donor cell in view of the user equipment. Also, the plurality of cells respectively have their physical cell ID (defined in LTE release-8), and the relay node may transmit its synchronization channel, reference signal, etc. In case of single-cell operation, the user equipment directly receives scheduling information and HARQ feedback from the relay node and transmits its control channel (scheduling request (SR), CQI, ACK/NACK, etc.) to the relay node. Also, in view of the legacy user equipments (operated in accordance with the LTE release-8 system), the type-1 relay node is regarded as a legacy base station (operated in accordance with the LTE release-8 system). Namely, the type-1 relay node has backward compatibility. Meanwhile, in view of the user equipments operated in accordance with the LTE-A system, the type-1 relay node is regarded as a base station different from the legacy base station, whereby throughput improvement may be provided.

The type-1a relay node has the same features as those of the aforementioned type-1 relay node in addition to out-band operation. The type-1a relay node may be configured in such a manner that its operation is less affected or not affected by the operation of L1 (first layer) operation.

The type-2 relay node is an in-band relay node, and does not have separate physical cell ID, whereby a new cell is not formed. The type-2 relay node is transparent with respect to the legacy user equipment, and the legacy user equipment fails to recognize the presence of the type-2 relay node. Although the type-2 relay node may transmit the PDSCH, it does not transmit CRS and PDCCH.

Meanwhile, in order that the relay node is operated in accordance with in-band, some resources in time-frequency domains should be reserved for the backhaul link, and may be established so as not to be used for the access link. This will be referred to as resource partitioning.

The general principle in resource partitioning of the relay node will be described as follows. The backhaul downlink and the access downlink may be multiplexed on one carrier frequency in accordance with the TDM mode (namely, only one of the backhaul downlink and the access downlink is enabled for a specific time). Similarly, the backhaul uplink and the access uplink may be multiplexed on one carrier frequency in accordance with the TDM mode (namely, only one of the backhaul uplink and the access uplink is enabled for a specific time).

According to backhaul link multiplexing in the FDD mode, backhaul downlink transmission is performed in a downlink frequency band, and backhaul uplink transmission is performed in an uplink frequency band. According to backhaul link multiplexing in the TDD mode, backhaul downlink transmission is performed in a downlink subframe of the base station and the relay node, and backhaul uplink transmission is performed in an uplink subframe of the base station and the relay node.

In case of the in-band relay node, if backhaul downlink reception from the base station and access downlink transmission to the user equipment are performed in a predetermined frequency band at the same time, a signal transmitted from a transmitter of the relay node may be received in a receiver of the relay node, whereby signal interference or RF jamming may occur in RF front-end of the relay node. Similarly, if access uplink reception from the user equipment and backhaul uplink transmission to the base station are performed in predetermined frequency band at the same time, signal interference may occur in RF front-end of the relay node. Accordingly, it is difficult to perform simultaneous transmission and reception in one frequency band of the relay band unless sufficient separation (for example, a transmitting antenna and a receiving antenna are locally spaced apart from each other (for example, the transmitting antenna is installed on the ground and the receiving antenna is installed below the ground)) between the receiving signal and the transmitting signal is provided.

One solution for solving the problem of signal interference is that the relay node is operated so as not to transmit a signal to the user equipment when receiving a signal from a donor cell. In other words, a gap occurs in transmission from the relay node to the user equipment, and the user equipment (including legacy user equipment) may be configured so as not to expect any transmission from the relay node for the gap. The gap may be configured by a multicast broadcast single frequency network (MBSFN) subframe.

Figure 9:
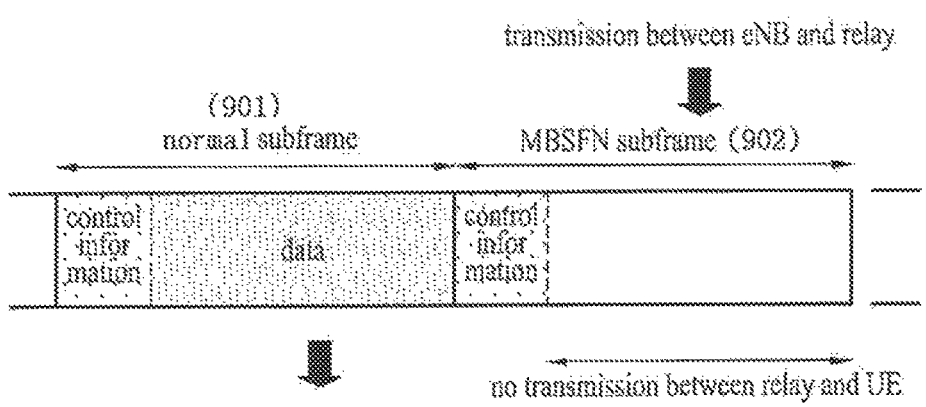
FIG. 9 is a diagram illustrating an example of relay node resource partitioning.

FIG. 9 is a diagram illustrating an example of resource partitioning of a relay node.

In FIG. 9, the first subframe is a normal subframe (901), and a downlink (i.e., access downlink) control signal and data are transmitted from the relay node to the user equipment. The second subframe is an MBSFN subframe (902), and a control signal is transmitted from the relay node to the user equipment in a control region of a downlink subframe but no signal is transmitted from the relay node to the user equipment in other regions of the downlink subframe. Since the legacy user equipment expects transmission of a physical downlink control channel (PDCCH) from all downlink subframes (namely, since the relay node needs to support legacy user equipments in its zone to receive a PDCCH per subframe and perform a measurement function), for normal operation of the legacy user equipment, it is required to transmit the PDCCH from all the downlink subframes. Accordingly, even on a subframe (second subframe) configured for downlink (i.e., backhaul downlink) transmission from the base station to the relay node, the relay node needs to perform access downlink transmission not backhaul downlink reception, for first N (N=1, 2 or 3) OFDM symbol intervals of the subframe. Since the PDCCH is transmitted from the relay node to the user equipment, backward compatibility for the legacy user equipment, which is served by the relay node, may be provided in the control region of the second subframe (902). The relay node may receive transmission from the base station in the other regions of the second subframe (902) for the time when no transmission from the relay node to the user equipment is performed. Accordingly, this resource partitioning allows access downlink transmission and backhaul downlink reception not to be performed in the in-band relay node at the same time.

The second subframe (902) which is the MBSFN subframe will be described in more detail. The control region of the second subframe (902) may be regarded as a relay node non-hearing interval. The relay node non-hearing interval means that the relay node does not receive a backhaul downlink signal but transmits an access downlink signal. This interval may be set to 1, 2, or 3 OFDM length as described above. For the relay node non-hearing interval, the relay node performs access downlink transmission to the user equipment, and receives backhaul downlink from the base station in the other regions. At this time, since the relay node cannot perform transmission and reception in the same frequency band at the same time, it requires time to switch a transmission mode of the relay node to a reception mode of the relay node. Accordingly, a guard time (GT) is required for first some interval of a backhaul downlink receiving zone, so that the relay node performs transmission/reception mode switching. Similarly, even in the case that the relay node is operated to receive a backhaul downlink from the base station and transmit an access downlink to the user equipment, a guard time (GT) for reception/transmission mode switching of the relay node may be set. The length of the guard time may be given by a value of a time domain. For example, the length of the guard time may be given by k (k≥1) time sample (Ts) values, or one or more OFDM symbol lengths. Also, the guard time of the last portion of the subframe may not be defined, or may not be set either if backhaul downlink subframes of the relay node are set continuously or depending on timing alignment of predetermined subframes. The guard time may be defined in a frequency domain only set for backhaul downlink subframe transmission, to maintain backward compatibility (if the guard time is set for the access downlink interval, the legacy user equipment cannot be supported). For the backhaul downlink reception interval except for the guard time, the relay node may receive the PDCCH and the PDSCH from the base station. The PDCCH and the PDSCH may be referred to as a relay-PDCCH (R-PDCCH) and a relay-PDSCH (R-PDSCH) in view of physical channels dedicated for the relay node.

Figure 10:
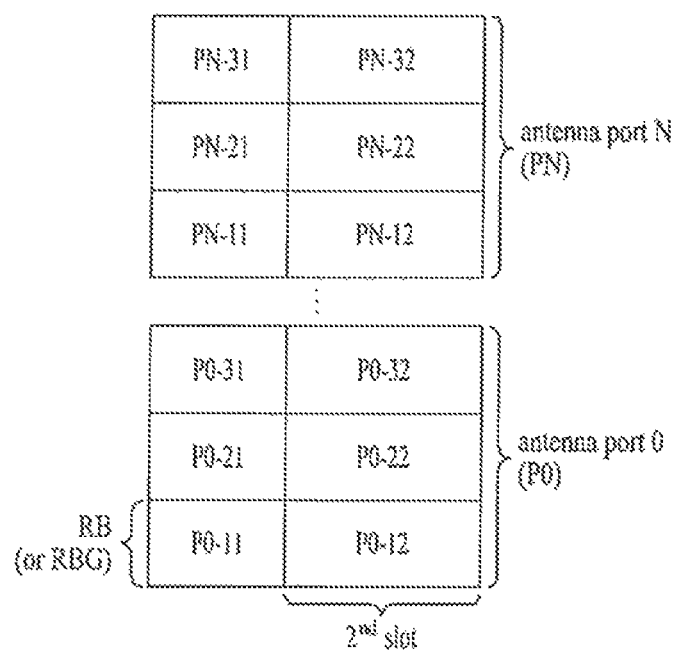
FIG. 10 is a diagram illustrating respective resources configured by time and frequency domains.

FIG. 10 is a diagram illustrating respective resources configured by time and frequency domains.

Referring to FIG. 10, the frequency domain and the time domain in resource regions marked with Px-yy (x, y=0, 1, 2, 3, . . . ) may be configured to have various sizes. In particular, Px-y1 means the first slot or a part of the first slot, and Px-y2 means the second slot or a part of the second slot.

The resource regions will be described based on the 3GPP LTE system, for example. It may be assumed that the resource regions are partitioned in a unit of RB. In this case, P0-12 is configured by twelve subcarriers in the frequency domain and seven OFDM symbols in the time domain. Also, it may be assumed that the resource regions are partitioned in a unit of RBG that includes four RBs. In this case, P0-12 is configured by 48 subcarriers in the frequency domain, which are increased as much as four times.

Also, the region Px-y1 is the resource region configured by symbols equal to or smaller than those of the region Px-y2. The number of symbols may be varied depending on a cyclic prefix (CP) length. For example, assuming that the resource regions are partitioned in a unit of RB, Px-y1 is configured by twelve subcarriers in the frequency domain and four OFDM symbols in the time domain. Also, assuming that the resource regions are partitioned in a unit of RBG, the frequency domain is increased as much as a multiple of RB unit.

Also, in FIG. 10, Pn (n=0, 1, 2, 3. . . ) indicates antenna ports or layer indexes used for multiple layer transmission through multiple antennas, wherein the antenna ports may mean resource regions that may be identified from one another and may transmit different kinds of information.

Hereinafter, a method for allocating control information and data in the aforementioned resource configuration will be described. For convenience, it is assumed that the aforementioned resource configuration is identified by a unit of RB.

Preferably, the control information R-PDCCH between the base station and the relay node is transmitted to a specific region which is previously defined. In particular, if resource allocation (RA) type 0 of the LTE system is used, it is suggested that the control information R-PDCCH is limited to the Kth RB (K is an integer smaller than the number of RBs within RBG group) of the RBG. In other words, it means that the R-PDCCH may be transmitted to the Kth RB of every RBG. K may be the first RB or the last RB of the RBG. RBG concept may be shared by the RA types 1 and 2. Likewise, a specific RB of the RBG may be used as a resource region for R-PDCCH transmission.

Figure 11:
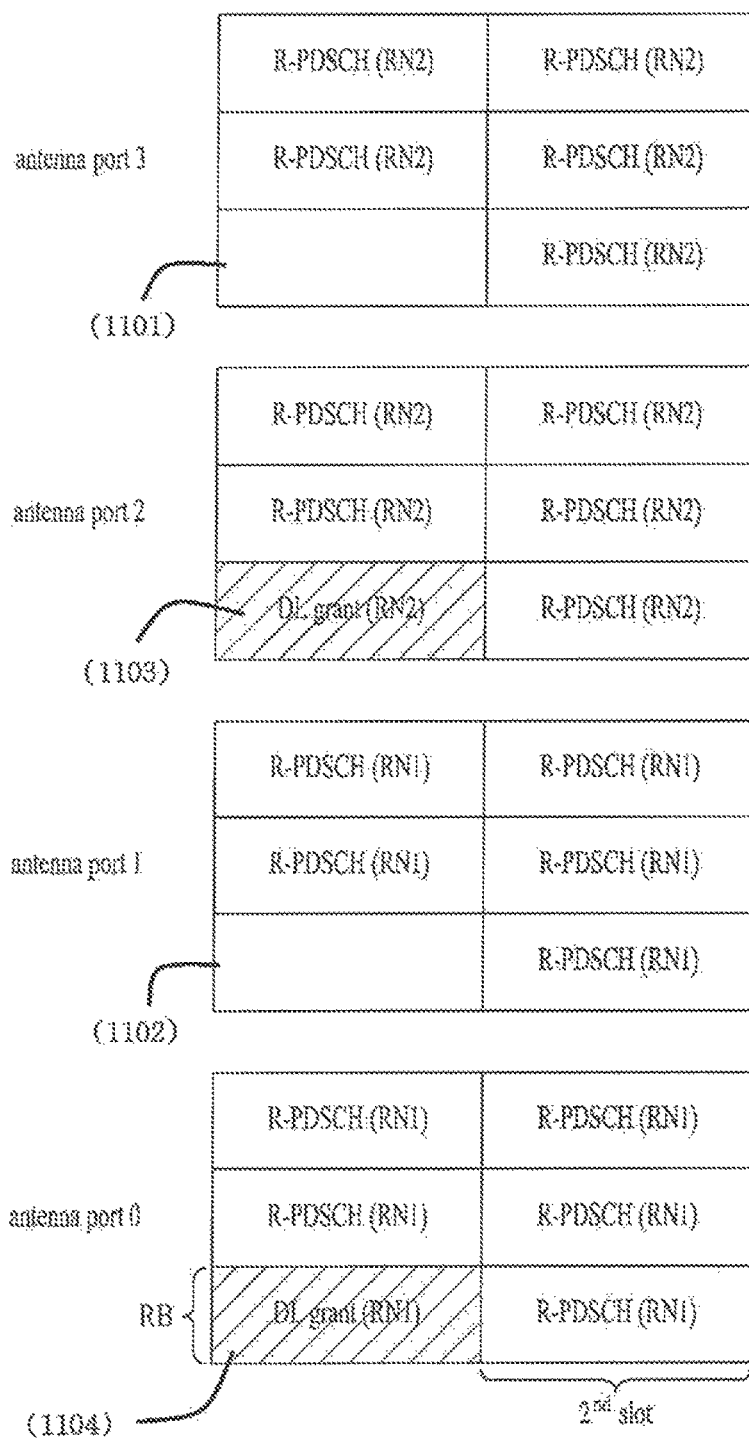
FIG. 11 is a diagram illustrating R-PDCCH and R-PDSCH multiplexing in a multiuser MIMO system according to the first embodiment of the present invention.

FIG. 11 is a diagram illustrating R-PDCCH and R-PDSCH multiplexing in a multiuser MIMO system according to the first embodiment of the present invention. Particularly, in FIG. 11, it is assumed that MIMO antenna transmission through four antenna ports is performed.

As illustrated in FIG. 11, if downlink signals are transmitted to the relay node 1 and the relay node 2 through two antenna ports, respectively, the antenna ports 0 and 1 may be allocated to the relay node 1 and the antenna ports 2 and 3 may be allocated to the relay node 2. Neither data nor control information is transmitted to empty regions (1101, 1102) of the antenna ports 1 and 3 to ensure performance of downlink grant (1104) for the relay node 1 and performance of downlink grant (1103) for the relay node 2.

Preferably, the R-PDCCH is transmitted using small number of antenna ports, if possible, to enhance reliability in view of properties of the control information. Accordingly, it is preferable that DL grant is set to be transmitted to one antenna port. In other words, two antenna ports are used for the R-PDCCH.

Scrambling codes may be used to identify the antenna ports used for each relay node. In other words, if the number of available antenna ports is 2 in the system, a total of logical antenna ports may be formed using two scrambling codes.

FIG. 12 is a diagram illustrating R-PDCCH and R-PDSCH multiplexing in a multiuser MIMO system according to the second embodiment of the present invention.

FIG. 12 is different from FIG. 11 in that neither data nor control information is transmitted to regions (1200) corresponding to all the ports to which downlink grant is transmitted so as to improve reliability of the control information. In view of frequency, frequency division multiplexing is applied to the downlink grant for the relay node 1 (1201) and the downlink grant for the relay node 2 (1202), and the downlink grant for the relay node 1 (1201) has an antenna port different from that of that for the relay node 2 (1202).

Meanwhile, referring to FIG. 12, the present invention suggests that mapping and multiplexing information (MAMI) indicating whether uplink grant or R-PDSCH has been scheduled is inserted into the R-PDCCH. The mapping and multiplexing information will be described in more detail.

Figure 13:
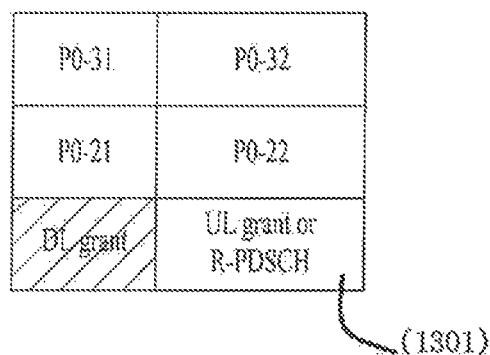
FIG. 13 is a diagram illustrating mapping and multiplexing information inserted into R-PDCCH suggested in the present invention.
Figure 14:
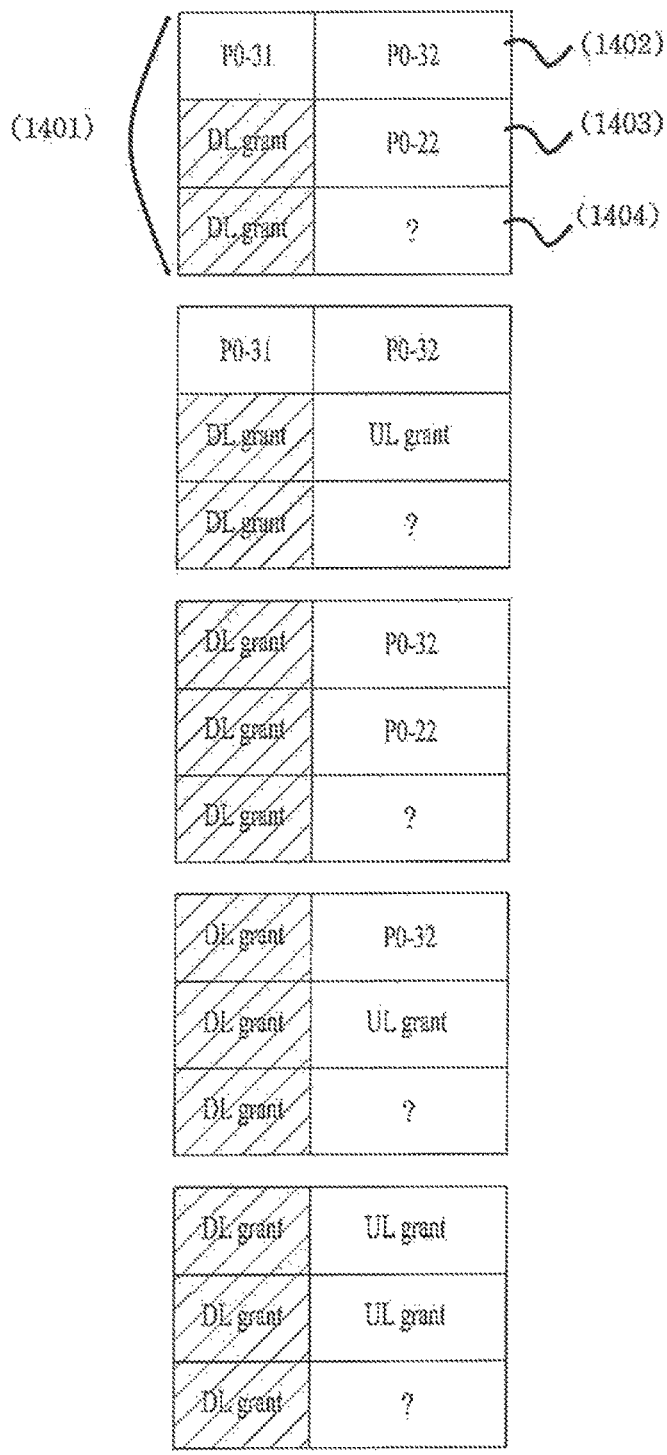
FIG. 14 is a diagram illustrating combination of R-PDSCH or uplink grant that may be scheduled in RBG configured by three RBs.

FIG. 13 is a diagram illustrating mapping and multiplexing information inserted into R-PDCCH suggested in the present invention. Also, FIG. 14 is a diagram illustrating combination of R-PDSCH or uplink grant that may be scheduled in RBG configured by three RBs. Particularly, in FIG. 14, "?" marked in the region P0-12 indicates either uplink grant or R-PDSCH.

Referring to FIG. 13, it is assumed that the downlink grant is located in the P0-11 of RBG configured by three RBs. And, the uplink grant or R-PDSCH (1301) may be scheduled at the second slot of the subframe that includes the downlink grant. In this case, if mapping and multiplexing information is included in the downlink grant located in the P0-11, possible scheduling combinations shown in FIG. 14 may be expressed in the RBG (1401) configured by three RBs (1402, 1403 and 1404). In particular, all the cases may be expressed by 3 bit information in the RBG (1401) configured by three RBs (1402, 1403 and 1404).

Figure 16:
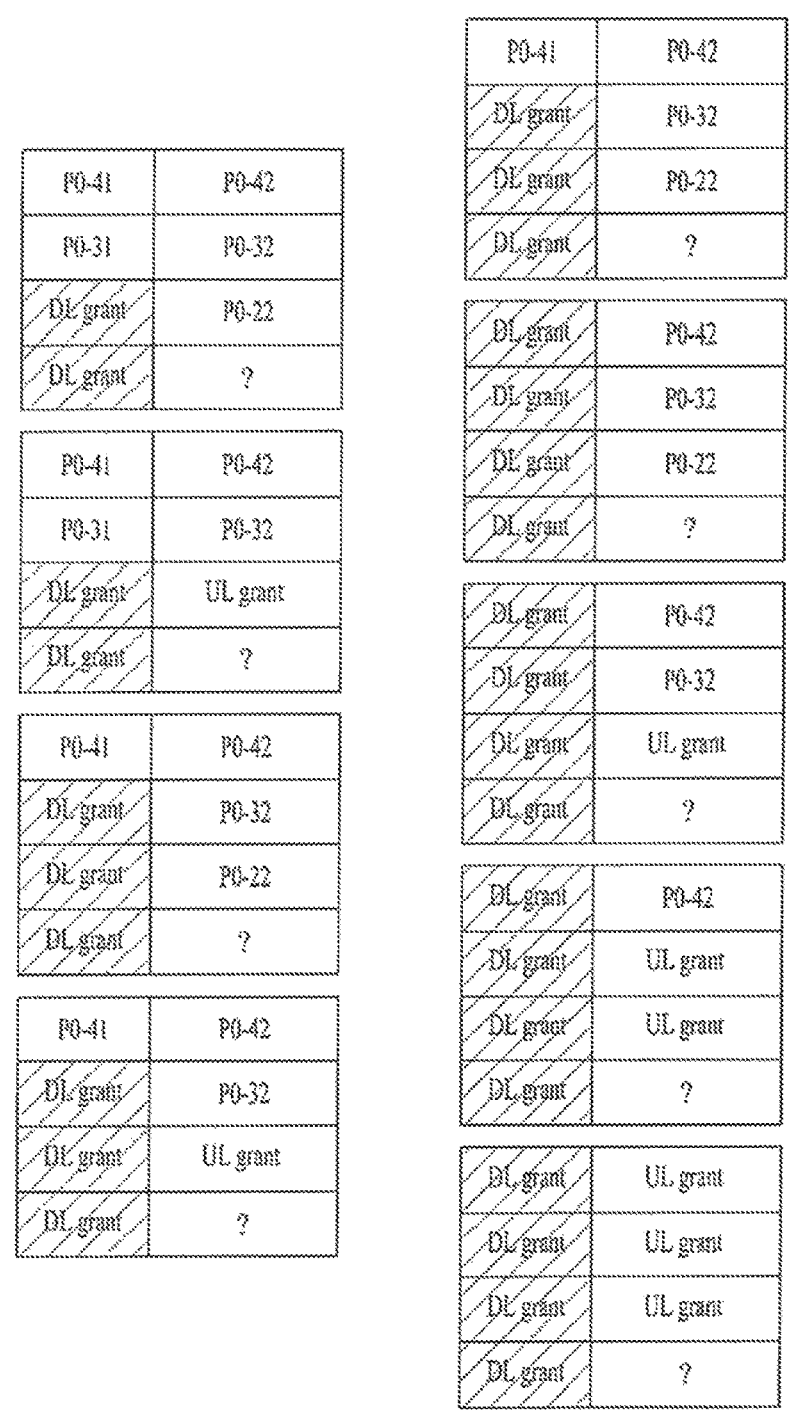

FIG. 15 is a diagram illustrating another mapping and multiplexing information inserted into R-PDCCH suggested in the present invention. Also, FIG. 16 is a diagram illustrating combination of R-PDSCH or uplink grant that may be scheduled in RBG configured by three RBs. Particularly, in FIG. 16, "?" marked in the region P0-12 indicates either uplink grant or R-PDSCH.

Figure 17:
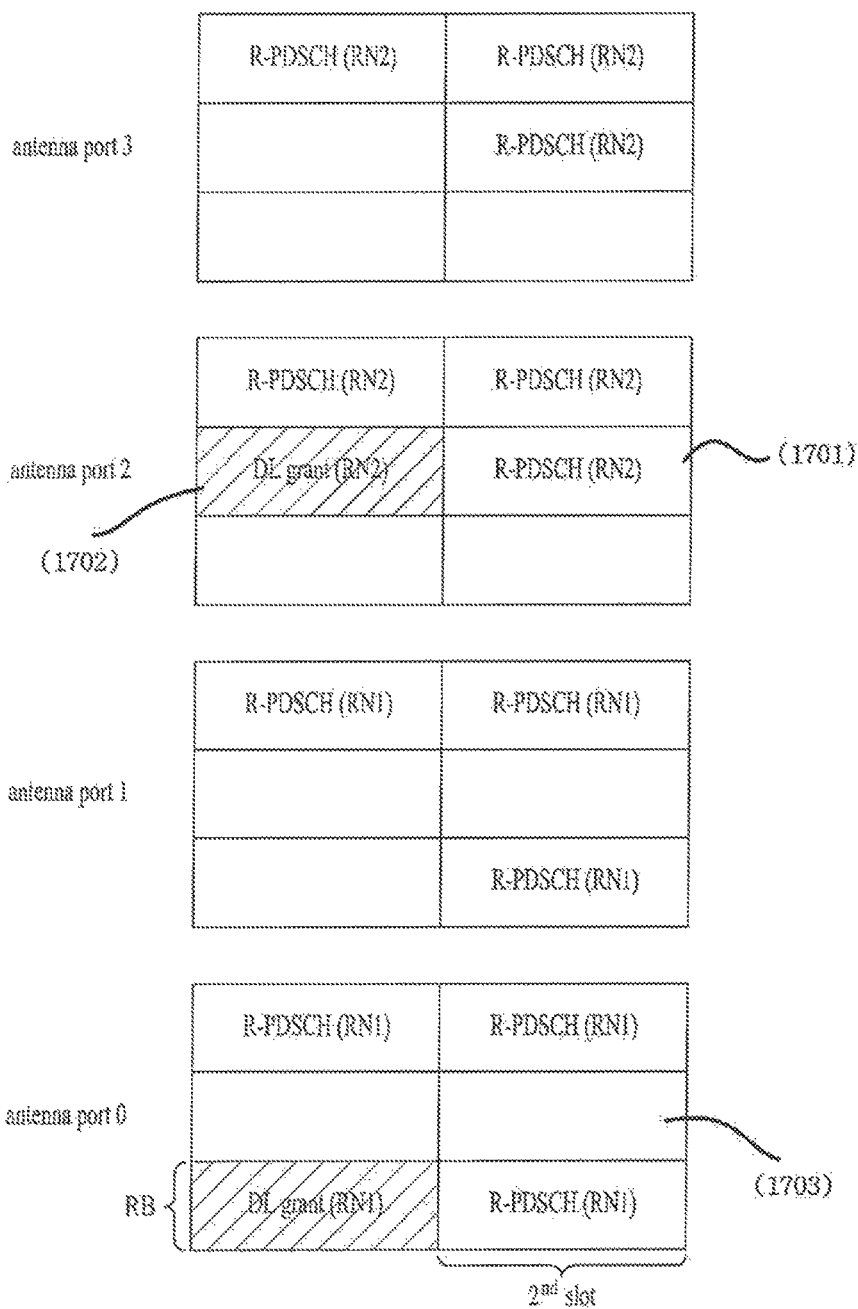
FIG. 17 is a diagram illustrating another example of R-PDCCH and R-PDSCH multiplexing in a multiuser MIMO system according to the second embodiment of the present invention.

FIG. 17 is a diagram illustrating another example of R-PDCCH and R-PDSCH multiplexing in a multiuser MIMO system according to the second embodiment of the present invention.

In FIG. 17, it is suggested that spatial multiplexing of data located at the second slot of RB where downlink grant exists is performed for the antenna port only allocated to the corresponding relay node but spatial multiplexing of data at the RB where downlink grant does not exist is performed for all the antenna ports. For example, since the region P2-22 of the antenna port 2 (1701) is used for transmission of data located at the second slot of the RB where downlink grant for the relay node 2 (1702) exists, the region P0-22 (1703) is not used at the antenna port 0.

Figure 18:
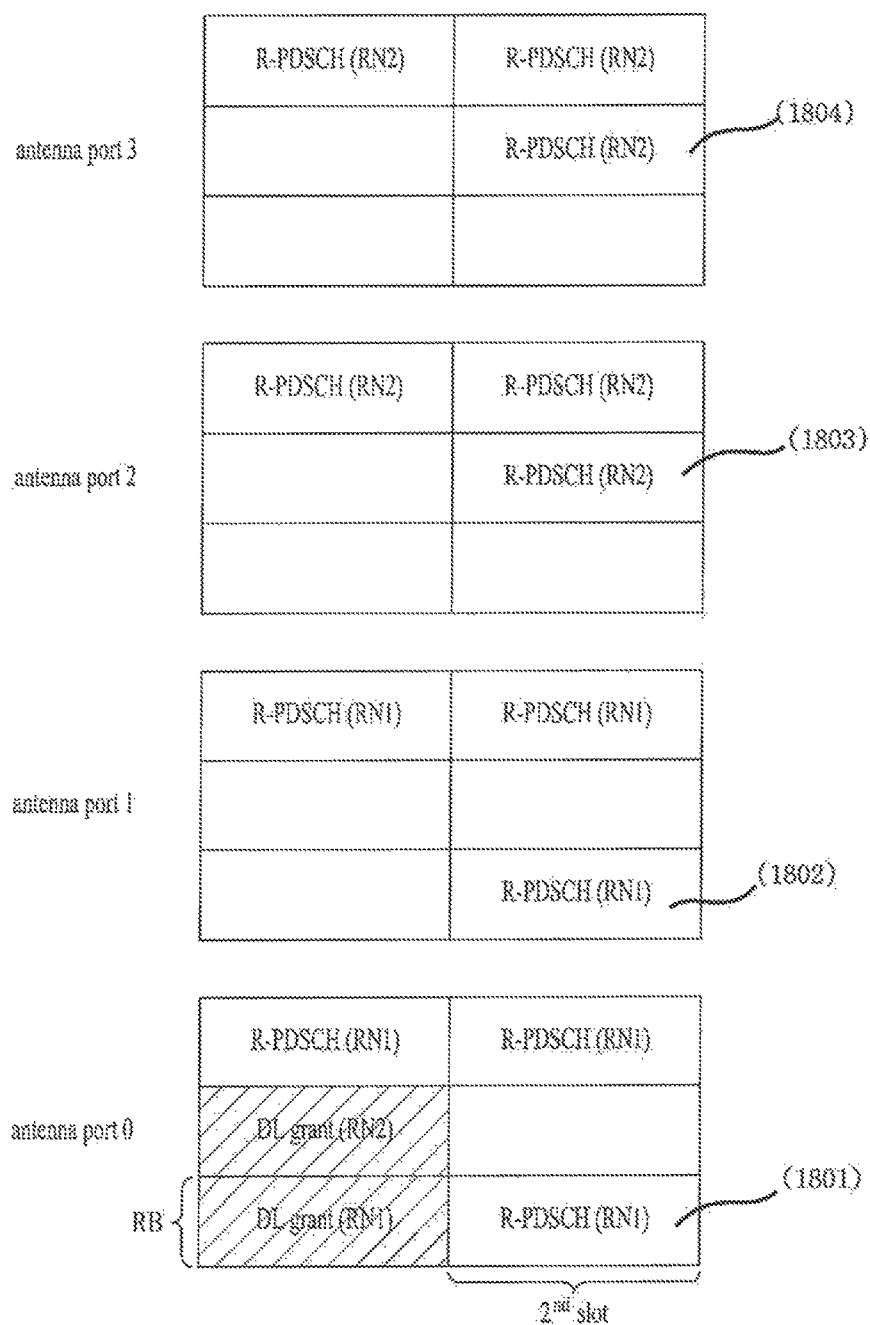
FIG. 18 is a diagram illustrating R-PDCCH and R-PDSCH multiplexing in a multiuser MIMO system according to the third embodiment of the present invention.

FIG. 18 is a diagram illustrating R-PDCCH and R-PDSCH multiplexing in a multiuser MIMO system according to the third embodiment of the present invention. FIG. 18 is different from FIG. 17 in that control information is located at one antenna point.

In FIG. 18, P0-12 of the antenna port 0 (1801) and P1-12 of the antenna port 1 (1802) may be used for the relay node 1, and P2-22 of the antenna port 2 (1803) and P3-2l of the antenna port 3 (1804) may be used for the relay node 2.

Figure 19:
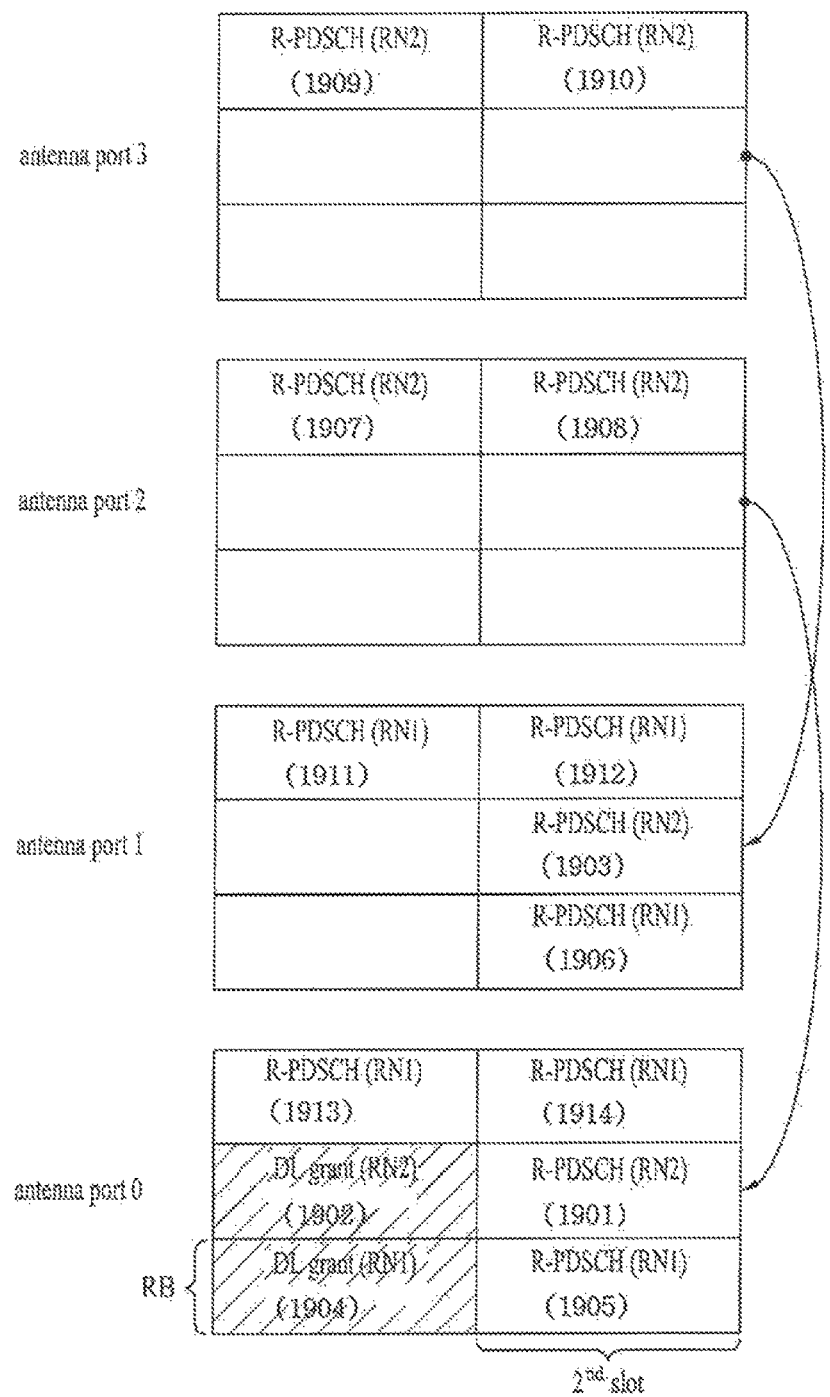
FIG. 19 is a diagram illustrating another example of R-PDCCH and R-PDSCH multiplexing in a multiuser MIMO system according to the third embodiment of the present invention.

FIG. 19 is a diagram illustrating another example of R-PDCCH and R-PDSCH multiplexing in a multiuser MIMO system according to the third embodiment of the present invention.

In FIG. 19, the R-PDSCH of the relay node 2 (1901) is located at next slot to which the downlink grant of the relay node 2 (1902) located at the antenna port 0 is transmitted.

This mapping method is advantageous in that control information is decoded using one antenna port and data may be demodulated in the corresponding RB through one antenna port. In particular, since the R-PDSCH of the relay node 2 (1901) exists in the region P0-22, spatial multiplexing is preferably performed such that the R-PDSCH of the relay node 2 (1903) is located in the region P1-22. As a result, the R-PDSCH of the relay node 2 may be multiplexed using one antenna port and/or scrambling code.

Particularly, in FIG. 19, if blind decoding of the downlink grant existing in the region P1-11 (1904) is successfully performed, the relay node 1 performs demodulation and decoding by identifying whether its data or uplink grant (data in FIG. 19) exists at next slot. At this time, P0-12 (1905) and P1-12 (1906) are descrambled using one scrambling code, and dual layer demultiplexing is performed for each antenna port, whereby the R-PDSCH is demodulated.

Also, R-PDSCH (1905) decoding is performed for the second slot (P0-12) of the RB where the downlink grant of the relay node 1 (1904) exists, among the RBs belonging to the same RBG, and RBs where the downlink grant of the relay node 1 or the relay node 2 does not exist. Considering spatial multiplexing, R-PDSCH decoding is performed for P1-12 (1906), P1-31 (1911), and P1-32 (1912).

In case of the relay node 2, control information is acquired by decoding of the downlink grant existing in P0-21 (1902). Since the relay node 2 recognizes that R-PDSCH exists at next slot where the downlink grant is detected, it may demodulate the R-PDSCH. However, different scrambling codes may be used depending on the location of the antenna port where the R-PDSCH of the relay node 2 is located. For example, although P0-22 (1901), P1-22 (1903) and P2-31 (1907) may be scheduled using the same relay node as that used to schedule P2-32 (1908), P3-31 (1909) and P3-32 (1910), different scrambling codes are used for the resource blocks. Unlike the relay node 2, the relay node 1 is different from the relay node 2 in that one same scrambling code is used for P0-12 (1905), P0-31 (1913), P0-32 (1914), P1-12 (1906), P1-31 (1911) and P1-32 (1912).

Figure 20:
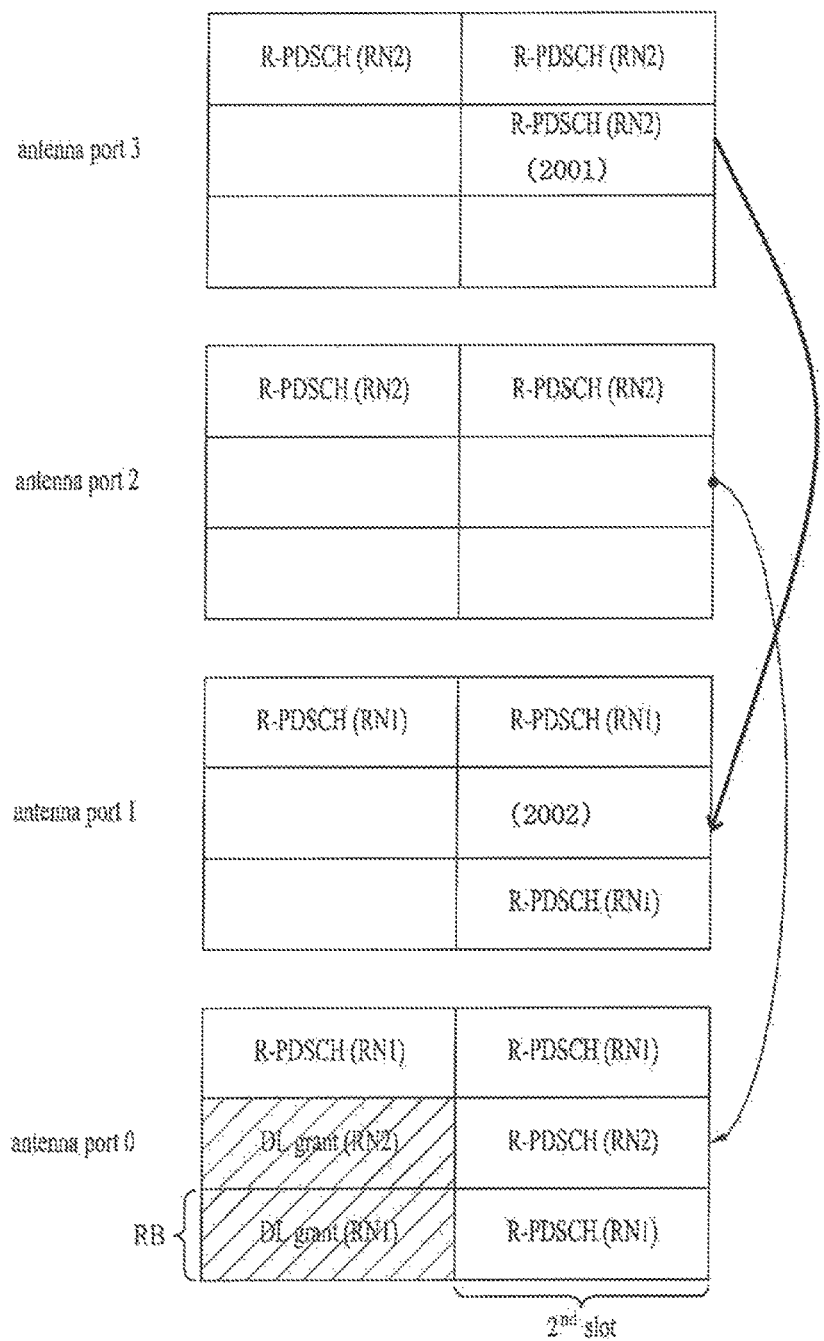
FIG. 20 is a diagram illustrating other example of R-PDCCH and R-PDSCH multiplexing in a multiuser MIMO system according to the third embodiment of the present invention.

FIG. 20 is a diagram illustrating other example of R-PDCCH and R-PDSCH multiplexing in a multiuser MIMO system according to the third embodiment of the present invention. As illustrated in FIG. 20, for symmetry to the relay node 1, the R-PDSCH of P1-22 (2002) which is the data of the relay node 2 may be located in P3-22 (2001).

In the meantime, the present invention may consider a method for indicating a size of RB to which a control region is transmitted. This RB size information may be indicated through R-PDCCH or upper layer, i.e., RRC signaling.

In the example of FIG. 12, two RBs are occupied by the downlink grant, and this information of two RBs may be used to assist demodulation and decoding of the downlink grant and R-PDSCH. In other words, a blind decoding region of the R-PDCCH may be restricted. As a result, it is advantageous in that the region where the R-PDSCH exists may be indicated explicitly.

For example, if the information as to that two RBs are occupied by the downlink grant is signaled through the R-PDCCH, blind decoding is performed from the first RB of the RBG that includes DL grant at the antenna port 0 in view of the R-PDCCH, and blind decoding is performed in an inverse order from the second RB of the RBG that includes a DL grant region at the antenna port 1.

If aggregation levels of all the relay nodes are 1, signaling for a size of the region occupied by the downlink grant is the same as signaling of the number of relay nodes which are spatially multiplexed. In other words, if the R-PDCCH of each relay node exists at the first antenna port of antenna port pairs allocated to each relay node, i.e., antenna port 0 or antenna port 2, the relay node performs blind decoding for the downlink grant on the basis of a reference signal existing at the antenna port 0 or the antenna port 2.

Figure 21:
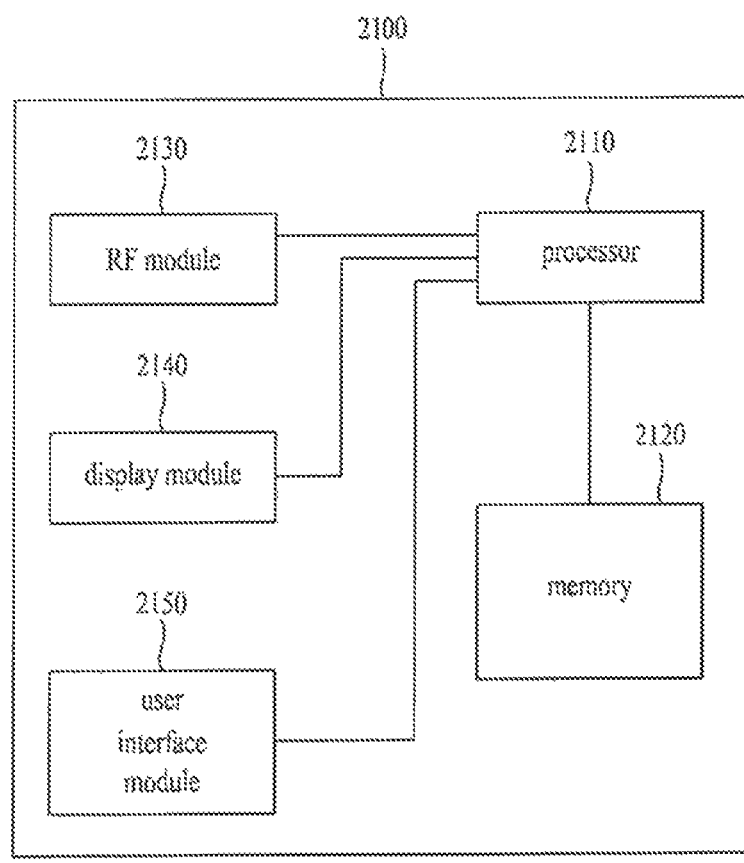
FIG. 21 is a block diagram illustrating a communication apparatus according to one embodiment of the present invention.

FIG. 21 is a block diagram illustrating a communication apparatus according to one embodiment of the present invention.

Referring to FIG. 21, the communication apparatus 2100 includes a processor 2110, a memory 2120, a radio frequency (RF) module 2130, a display module 2140, and a user interface module 2150.

The communication apparatus 2100 is illustrated for convenience of description, and some of its modules may be omitted. Also, the communication apparatus 2100 may further include necessary modules. Moreover, some modules of the communication apparatus 2100 may be divided into segmented modules. The processor 2110 is configured to perform the operation according to the embodiment of the present invention illustrated with reference to the drawings. In more detail, a detailed operation of the processor 2110 will be understood with reference to the disclosure described with reference to FIG. 1 to FIG. 20.

The memory 2120 is connected with the processor 2110 and stores an operating system, an application, a program code, and data therein. The RF module 2130 is connected with the processor 2110 and converts a baseband signal to a radio signal or vice versa. To this end, the RF module 2130 performs analog conversion, amplification, filtering and frequency uplink conversion, or their reverse processes. The display module 2140 is connected with the processor 2110 and displays various kinds of information. Examples of the display module 2140 include, but not limited to, a liquid crystal display (LCD), a light emitting diode (LED), and an organic light emitting diode (OLED). The user interface module 2150 is connected with the processor 2110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting and receiving signals between a base station and a relay node in a multiuser multi-antenna wireless communication system and the apparatus for the same have been described based on the 3GPP LTE system, they may be applied to various multi-antenna wireless communication systems in addition to the 3GPP LTE system.

What is claimed:

1. A method for transmitting signals to a receiving end at a transmitting end in a wireless communication system, the method comprising:
   transmitting a relay node specific downlink physical control channel (R-PDCCH) in a first slot of at least one resource block (RB) pair of two or more RB pairs; and
   transmitting a relay node specific downlink physical shared channel (R-PDSCH) in the two or more RB pairs,
   wherein the R-PDCCH includes a downlink assignment for the R-PDSCH,
   wherein a number of the at least one RB pair is configured via a radio resource control (RRC) layer signaling;
   wherein one of the R-PDSCH and an uplink grant is scheduled in a second slot of the at least one RB pair of the two or more RB pairs
   wherein the R-PDCCH includes mapping and multiplexing information (MAMI) indicating a number of RB pairs on which the uplink grant is scheduled in second slots of the two or more RB pairs except for the at least one RB pair,
   wherein, when the number of RB pairs on which the uplink grant is scheduled is greater than 0, the MAMI further indicates which RB pairs on which the uplink grant is scheduled.

2. A transmitting end in a wireless communication system, the transmitting end comprising:
   a Radio Frequency (RF) module; and
   a processor configured to
      transmit, to a receiving end, a relay node specific downlink physical control channel (R-PDCCH) in a first slot of at least one resource block (RB) pair of two or more RB pairs, and
      transmit, to the receiving end, a relay node specific downlink physical shared channel (R-PDSCH) in the two or more RB pairs,
   wherein the R-PDCCH includes a downlink assignment for the R-PDSCH,
   wherein a number of the at least one RB pair is configured via a radio resource control (RRC) layer signaling;
   wherein one of the R-PDSCH and an uplink grant is scheduled in a second slot of the at least one RB pair of the two or more RB pairs
   wherein the R-PDCCH includes mapping and multiplexing information (MAMI) indicating a number of RB pairs on which the uplink grant is scheduled in second slots of the two or more RB pairs except for the at least one RB pair,
   wherein, when the number of RB pairs on which the uplink grant is scheduled is greater than 0, the MAMI further indicates which RB pairs on which the uplink grant is scheduled.

3. A method for receiving signals from a transmitting end at a receiving end in a wireless communication system, the method comprising:

receiving a relay node specific downlink physical control channel (R-PDCCH) in a first slot of at least one resource block (RB) pair of two or more RB pairs;

receiving a relay node specific downlink physical shared channel (R-PDSCH) in the two or more RB pairs, wherein the R-PDCCH includes a downlink assignment for the R-PDSCH, wherein a number of the at least one RB pair is configured via a radio resource control (RRC) layer signaling;

wherein one of the R-PDSCH and an uplink grant is scheduled in a second slot of the at least one RB pair of the two or more RB pairs wherein the R-PDCCH includes mapping and multiplexing information (MAMI) indicating a number of RB pairs on which the uplink grant is scheduled in second slots of the two or more RB pairs except for the at least one RB pair, wherein, when the number of RB pairs on which the uplink grant is scheduled is greater than 0, the MAMI further indicates which RB pairs on which the uplink grant is scheduled.

4. A receiving end in a wireless communication system, the receiving end comprising:

a Radio Frequency (RF) module; and a processor configured to receive, from a transmission end, a relay node specific downlink physical control channel (R-PDCCH) in a first slot of at least one resource block (RB) pair of two or more RB pairs, and receive, from the transmission end, a relay node specific downlink physical shared channel (R-PDSCH)) in the two or more RB pairs, wherein the R-PDCCH includes a downlink assignment for the R-PDSCH, wherein a number of the at least one RB pair is configured via a radio resource control (RRC) layer signaling;

wherein one of the R-PDSCH and an uplink grant is scheduled in a second slot of the at least one RB pair of the two or more RB pairs wherein the R-PDCCH includes mapping and multiplexing information (MAMI) indicating a number of RB pairs on which the uplink grant is scheduled in second slots of the two or more RB pairs except for the at least one RB pair, wherein, when the number of RB pairs on which the uplink grant is scheduled is greater than 0, the MAMI further indicates which RB pairs on which the uplink grant is scheduled.

\* \* \* \* \*